US009541093B2

(12) United States Patent
Joergl et al.

(10) Patent No.: US 9,541,093 B2
(45) Date of Patent: Jan. 10, 2017

(54) MULTI-STAGE TURBOCHARGER ARRANGEMENT

(75) Inventors: Volker Joergl, Breitenfurt (AT); Timm Kiener, Ludwigsburg (DE); Michael Becker, Esslingen (DE); Thomas Kritzinger, Frankenburg a.H. (AT); Rainer Kolmar, Hoerdt (DE)

(73) Assignee: BorgWarner Inc., Auburn Hills, MI (US)

( * ) Notice: Subject to any disclaimer, the term of this patent is extended or adjusted under 35 U.S.C. 154(b) by 554 days.

(21) Appl. No.: 14/001,293

(22) PCT Filed: Feb. 28, 2012

(86) PCT No.: PCT/US2012/026879
§ 371 (c)(1),
(2), (4) Date: Aug. 23, 2013

(87) PCT Pub. No.: WO2012/121925
PCT Pub. Date: Sep. 13, 2012

(65) Prior Publication Data
US 2014/0127002 A1    May 8, 2014

(30) Foreign Application Priority Data
Mar. 4, 2011    (DE) .......... 10 2011 013 063

(51) Int. Cl.
*F04D 27/00*    (2006.01)
*F02D 23/00*    (2006.01)
(Continued)

(52) U.S. Cl.
CPC .............. *F04D 27/00* (2013.01); *F01N 3/046* (2013.01); *F02B 37/004* (2013.01);
(Continued)

(58) Field of Classification Search
CPC ....... F01N 3/046; F02B 37/004; F02B 37/013; F02B 37/18; F02B 37/183; F02B 39/005; F02C 6/12; F02D 23/00; F02M 25/0711; F04D 27/00; F04D 27/02; Y02T 10/121; Y02T 10/144; Y02T 10/20
(Continued)

(56) References Cited

U.S. PATENT DOCUMENTS 4,203,315 A * 5/1980 Vieu ..................... G01N 29/30
73/1.86
6,176,082 B1    1/2001 Shaffer
(Continued)

FOREIGN PATENT DOCUMENTS

DE    102010062403 A1 *  6/2012 ........... F02B 37/183
WO    2004097195 A1    11/2004
WO    2007098133 A1    8/2007

OTHER PUBLICATIONS

English Abstract of DE 10 2010 062 403 A1. Printed on Jul. 2, 2016.*
(Continued)

*Primary Examiner* — Nicholas J Weiss
*Assistant Examiner* — Paul Thiede
(74) *Attorney, Agent, or Firm* — BrooksGroup

(57) ABSTRACT

A multi-stage turbocharger arrangement (TLA), having a high-pressure stage, the high-pressure turbine of which has an associated first bypass valve; and having a low-pressure stage which is arranged downstream as viewed in the flow direction of the exhaust gases and which has a low-pressure turbine and a second bypass valve, wherein at least one of the bypass valves is arranged in an associated, cooled housing module.

16 Claims, 4 Drawing Sheets

(51) Int. Cl.

| | |
|---|---|
| *F01N 3/04* | (2006.01) |
| *F02B 37/18* | (2006.01) |
| *F02C 6/12* | (2006.01) |
| *F02B 37/013* | (2006.01) |
| *F02B 39/00* | (2006.01) |
| *F02B 37/00* | (2006.01) |
| *F04D 27/02* | (2006.01) |

(52) U.S. Cl.
CPC ............ *F02B 37/013* (2013.01); *F02B 37/18* (2013.01); *F02B 37/183* (2013.01); *F02B 39/005* (2013.01); *F02C 6/12* (2013.01); *F02D 23/00* (2013.01); *F02M 26/08* (2016.02); *F04D 27/02* (2013.01); *Y02T 10/144* (2013.01); *Y02T 10/20* (2013.01)

(58) Field of Classification Search
USPC .......................... 415/145, 148; 60/612, 614
See application file for complete search history.

(56) References Cited

U.S. PATENT DOCUMENTS

| | | | |
|---|---|---|---|
| 2010/0300087 A1 | 12/2010 | Liu et al. | |
| 2011/0061381 A1* | 3/2011 | Harris | F02B 37/013 60/612 |
| 2011/0116910 A1* | 5/2011 | Lilly | F02D 9/1015 415/148 |
| 2011/0131985 A1* | 6/2011 | Smatloch | F02B 37/004 60/614 |
| 2011/0167927 A1* | 7/2011 | Healey | F03B 13/00 73/861.353 |

OTHER PUBLICATIONS

International Search Report ; date of mailing , Sep. 14, 2012 ; for International Application No. PCT/US2012/026879 ; 3 pages.

* cited by examiner

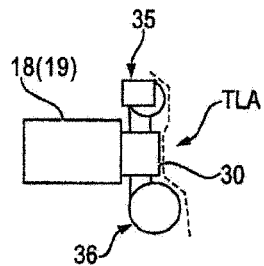
FIG.9
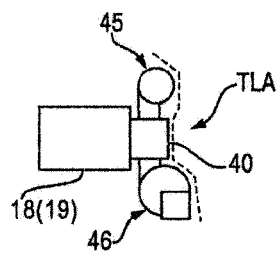
FIG.10
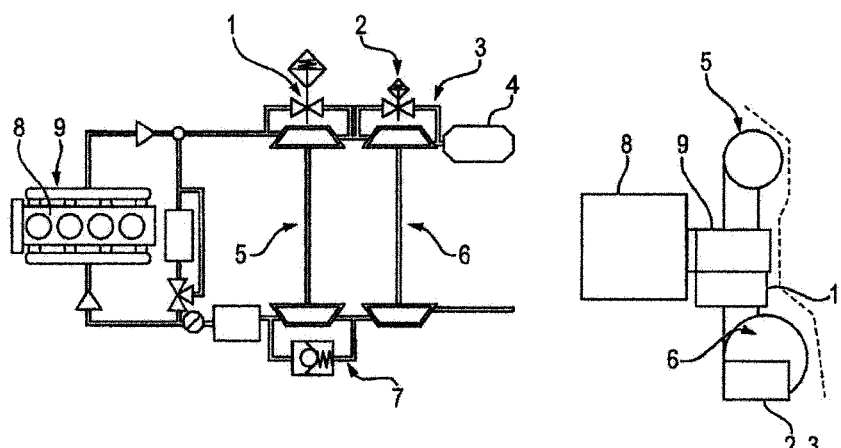
FIG.11A
(Prior Art)
FIG.11B
(Prior Art)

MULTI-STAGE TURBOCHARGER ARRANGEMENT

This application claims the benefit of PCT Application Serial No. 2012/26879 filed Feb. 28, 2012, and German Patent Application Serial No. DE 10 20110130632 filed Mar. 4, 2011.

The invention relates to a multi-stage turbocharger arrangement as per the preamble of claim 1.

Such a known turbocharger arrangement is illustrated in FIGS. 11A and 11B.

The example illustrated is a two-stage turbocharger arrangement having a high-pressure stage 5 and a low-pressure stage 6, which are designed in each case as conventional exhaust-gas turbochargers with a turbine and with a compressor. Here, the high-pressure stage 5 is assigned a high-pressure bypass valve 1 and the low-pressure stage 6 is assigned a low-pressure bypass valve 2. The known multi-stage turbocharger arrangement is in the usual way coupled via an exhaust line to an exhaust manifold 9 of a cylinder head 8 of an internal combustion engine. As is also shown in FIG. 11A, the high-pressure compressor is provided with a high-pressure compressor bypass 7.

In the known turbocharger arrangement, the gas flowing out of the cylinder head 8 is introduced into the non-cooled exhaust manifold 9. The exhaust gas is then split up into a fraction which flows through the turbine of the high-pressure stage 5 and a fraction which bypasses the high-pressure stage 5 and flows directly to the turbine of the low-pressure stage 6. The fraction of the diverted exhaust-gas flow is controlled by means of the bypass valve 1. The turbine of the low-pressure stage 6 can likewise be bypassed. For this purpose, the bypass valve 2 can be opened such that the exhaust-gas flow is conducted past the turbine of the low-pressure stage and flows directly into an aftertreatment device 4. Fresh air enters into the compressor of the low-pressure stage 6, is compressed and then either flows through the high-pressure stage 5 or bypasses the compressor of the high-pressure stage 5 via the bypass 7, and then flows into the cylinder head of the engine.

In the known arrangement, the exhaust manifold 9, the turbine of the high-pressure stage 5, the turbine of the low-pressure stage 6 including the bypass or wastegate valve 2, and the bypass valve 1 are produced from high-temperature-resistant steel or cast iron.

Since it is the case in the known arrangement that all of the gas-side components of the regulated two-stage turbocharger system must be produced from high-temperature-resistant steel or cast iron, said components are difficult and expensive to cast and to machine.

Here, it is not possible to reduce production costs by means of a simplification or even elimination of the regulating valves at the hot gas side, because this would otherwise result in a deterioration in the performance and fuel consumption characteristics of the engine provided with the turbocharger arrangement.

Cheap materials, which yield a reduction in the maximum tolerable peak temperatures of the exhaust gas, are unacceptable in particular owing to the adverse effect on fuel consumption characteristics.

Even though the turbocharger arrangement illustrated in simplified form in FIGS. 11A and 11B could be used not only in diesel engines but also in gasoline engines, such a use is however opposed by the abovementioned technical problems and the associated cost problems.

SUMMARY

It is therefore an object of the present invention to provide a multi-stage turbocharger arrangement as per the preamble of claim 1, which multi-stage turbocharger arrangement has bypass valve components which are exposed to lower temperature levels, thus permitting a broader range of application for the turbocharger arrangement with a simultaneous reduction in production costs.

Said object is achieved by means of the features of claim 1.

As a result of the provision of a (directly or indirectly) cooled housing module, it is possible for at least one, but preferably both, of the bypass valves which are exposed to the hot exhaust gases to be relocated into the cooled region of the housing module, such that the shafts which connect the valve actuators to the valve flaps now run in the cooled housing module. This furthermore yields the advantage that a considerable reduction in material costs for the elements of the bypass valves can be obtained owing to the reduced temperatures to which the components are exposed. Furthermore, the overall system layout is simpler and clearer in relation to the prior art. In particular, it is preferably possible for all of the valve flaps to be accommodated in one module (housing module), and the dimensions of the one or more turbine housings can be minimized, because in the turbocharger according to the invention there is no strict need for a wastegate duct integrated in the turbine housing.

The subclaims relate to advantageous refinements of the invention.

BRIEF DESCRIPTION OF THE DRAWINGS

Further details, advantages and features of the present invention will emerge from the following description of exemplary embodiments on the basis of the drawing, in which:

FIGS. 5 to 10 show illustrations, corresponding to FIGS. 1B and 2B, of further design variants of the turbocharger arrangement according to the invention, and FIGS. 11A, 11B show illustrations, corresponding to FIGS. 1A, 1B, of a turbocharger arrangement according to the prior art.

DETAILED DESCRIPTION OF ILLUSTRATIVE VARIATIONS

Figures 1A, 1B:
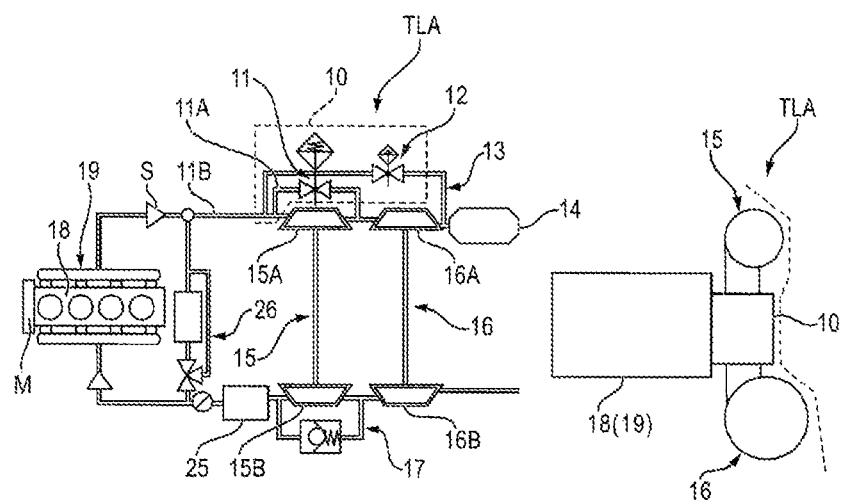
FIGS. 1A, 1B show schematically highly simplified diagrammatic illustrations of a first embodiment of the turbocharger arrangement according to the invention.

FIGS. 1A and 1B show a first embodiment of a multi-stage turbocharger arrangement according to the invention, which in the example is designed as a two-stage turbocharger arrangement TLA.

The turbocharger arrangement TLA has a high-pressure stage 15 with a high-pressure turbine 15A and a high-pressure compressor 15B. The high-pressure stage 15 is assigned a first bypass valve 11 in a bypass line 11A.

The turbocharger arrangement TLA furthermore has a low-pressure stage 16 arranged downstream as viewed in the flow direction S of the exhaust gases, which low-pressure stage has a low-pressure turbine 16A and a low-pressure compressor 16B. The low-pressure stage 16 is assigned a second bypass valve 12 which is arranged in a bypass duct 13, as can be seen in detail in particular from the illustration of FIG. 1A. The turbocharger arrangement TLA also has an aftertreatment device 14 in an exhaust line 11B, which aftertreatment device is positioned downstream of the low-pressure stage 16 as viewed in the flow direction S.

The high-pressure compressor 15B is provided with a high-pressure compressor bypass 17.

The turbocharger arrangement TLA self-evidently also has all the further components of such arrangements such as an exhaust-gas cooler 25 and an exhaust-gas recirculation arrangement 26; these however will not be described in detail as they are not of significance for explaining the principles of the present invention.

As is also shown in FIG. 1A, the turbocharger arrangement TLA is connected via the exhaust line 11B to an exhaust manifold 19 of a cylinder head 18 of an engine M.

To attain the advantages explained in the introduction, it is provided in the arrangement illustrated in FIGS. 1A and 1B that the first bypass valve 11 assigned to the high-pressure stage 15 and also the second bypass valve 12 are arranged in an associated directly or indirectly cooled housing module 10. By means of said arrangement, it is possible for all of the components of the bypass valves 11 and 12 to be exposed to exhaust gas at a considerably lower temperature, which both makes the design of the overall arrangement more compact and also makes it possible to use less heat-resistant materials for the valve elements.

In particular, the entire bypass valve module can be produced (in particular also as a separate component) from aluminum and cooled by means of water. This in turn permits a more cost-effective embodiment of the turbocharger arrangement TLA which is suitable for use not only for diesel engines but also for gasoline engines, even though the exhaust-gas temperatures of gasoline engines are higher than those of diesel engines.

As is also shown in FIG. 1A, the high-pressure bypass line 11A branches off from the exhaust line 11B upstream of the inlet of the turbine 15A and opens into the exhaust line 11B again upstream of the inlet of the low-pressure turbine 16A. Therefore, by means of the first bypass valve 11, the exhaust-gas flow is regulated between the pressure level of the exhaust manifold 19 and the pressure level of the inlet of the low-pressure turbine 16.

As a result of the arrangement of the low-pressure bypass line 13A which branches off from the exhaust line 11B upstream of the inlet of the high-pressure turbine 15A and opens into the exhaust line 11B again downstream of the outlet of the low-pressure turbine 16A, it is achieved that the second bypass valve 12 regulates the exhaust-gas flow between the inlet pressure level of the high-pressure turbine 15A and the outlet pressure level of the low-pressure turbine 16A or the inlet pressure level of the aftertreatment device 14.

Figures 2A, 2B:
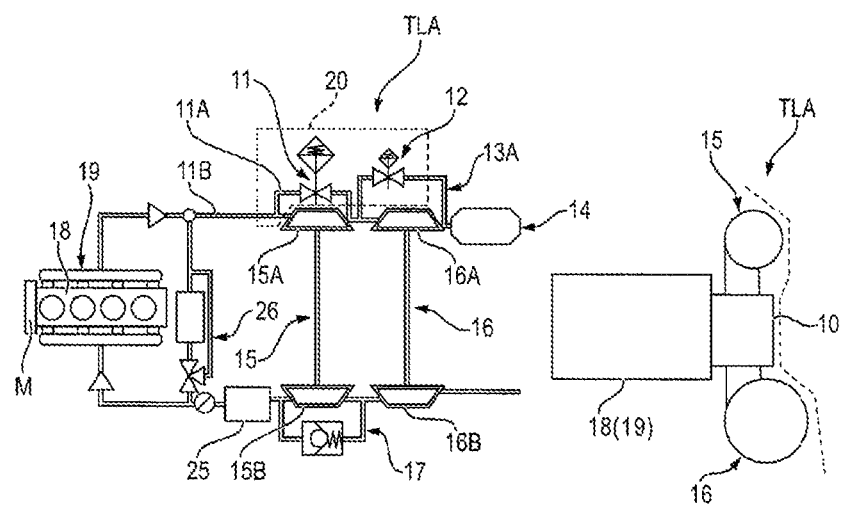
FIGS. 2A, 2B show illustrations, corresponding to FIGS. 1A, 1B, of a second embodiment of the turbocharger arrangement according to the invention.

A second embodiment of the turbocharger arrangement TLA according to the invention emerges when FIGS. 2A and 2B are viewed together. The design and function of said second embodiment substantially correspond to those of the embodiment according to FIGS. 1A and 1B, such that with regard to all common features, reference can be made to the description above.

The high-pressure bypass line 11A is arranged in the same way as in the embodiment according to FIG. 1A. The low-pressure bypass line 13A however branches off from the exhaust line 11B downstream of the high-pressure turbine 15A and opens into the exhaust line 11B again downstream of the outlet of the low-pressure turbine 16A. As a result of this arrangement, the bypass valve 11 regulates the exhaust-gas flow between the pressure level of the exhaust manifold 19 and the inlet pressure level of the low-pressure turbine 16A. The second bypass valve 12 regulates the exhaust-gas flow between the inlet pressure level of the low-pressure turbine 16A and the outlet pressure level of the low-pressure turbine 16A.

In this embodiment, too, both bypass valves 11 and 12 are arranged in an associated cooled housing module, which is illustrated in schematically highly simplified form and which is identified by the reference numeral 20. This embodiment therefore also yields the same advantages as the embodiment according to FIGS. 1A and 1B.

Figure 3:
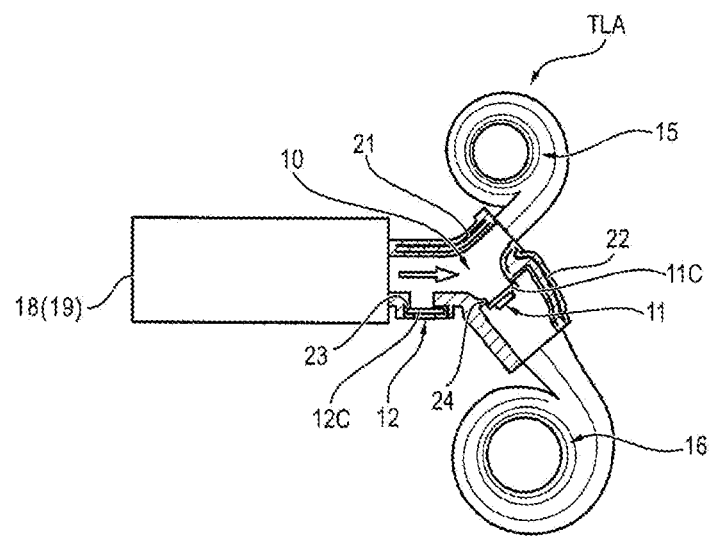
FIGS. 3, 4 show schematically slightly simplified structural designs of the turbocharger arrangements according to FIGS. 1A, 1B and 2A, 2B.

FIG. 3 illustrates, in schematically slightly simplified form, a structural design of the turbocharger arrangement TLA according to the embodiment of FIGS. 1A and 1B. Here, as symbolized by the block 18, 19, there is provided a cylinder head 18 with an integrated exhaust manifold 19 which is connected in terms of flow to the housing module 10. As indicated by the figure, in this embodiment, optional steel inserts 21 and 22 are provided which serve as heat shields which assist in reducing an introduction of heat into the cooled housing module 10. Furthermore, FIG. 3 shows valve seats 23 and 24 for the valve flaps 11C and 12C of the bypass valves 11 and 12, wherein said valve seats 23 and 24 are likewise cooled as a result of their arrangement in the housing module 10. In this embodiment, the bypass line 13 branches off above the high-pressure bypass valve 11.

Figure 4:
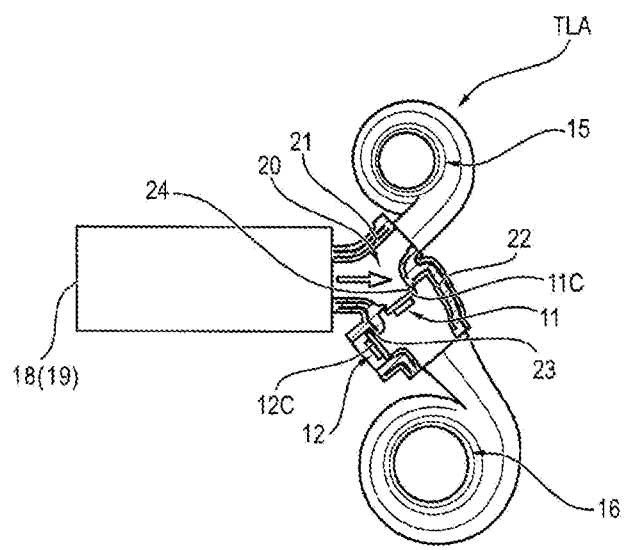

FIG. 4 shows an illustration, corresponding to FIG. 3, of the embodiment according to FIGS. 2A and 2B. This embodiment again has cooled valve seats 23 and 24 and optional steel inserts 21 and 22 for heat insulation.

FIGS. 5 to 10 show further schematically highly simplified illustrations, corresponding to FIGS. 1B and 2B, of alternative embodiments.

Figure 5:
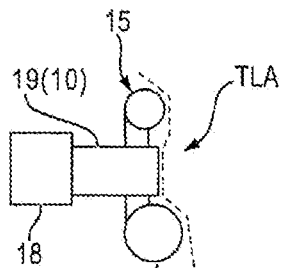

FIG. 5 shows an embodiment of the turbocharger arrangement TLA with the cylinder head 18 and with an integrated exhaust manifold 19 which comprises the housing module 10.

Figure 6:
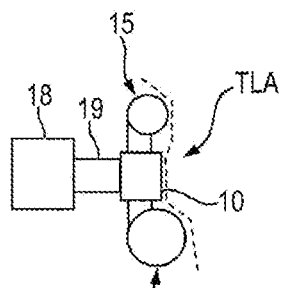

FIG. 6 shows a turbocharger arrangement TLA with a cylinder head 18, with a cooled exhaust manifold 19 and with a housing module 10 attached thereto.

Figure 7:
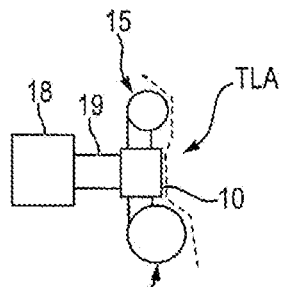

FIG. 7 shows a turbocharger arrangement TLA with a cylinder head 18, with a flange-mounted (cooled or non-cooled) exhaust manifold 19 and with a flange-mounted housing module 10.

Figure 8:
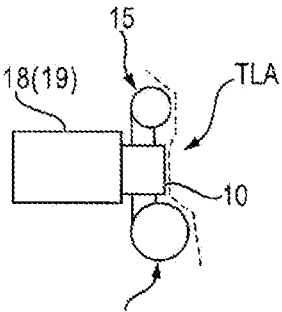

FIG. 8 shows a cylinder head 18 with an integrated exhaust manifold 19 and with a high-pressure stage housing module 10 flange-mounted thereon.

FIG. 9 shows a turbocharger arrangement TLA with a cylinder head 18 and with an integrated exhaust manifold 19 and with a flange-mounted high-pressure stage housing module 30.

FIG. 10 shows the cylinder head 18 with an integrated exhaust manifold 19 and with a high-pressure stage housing module 40, wherein it must be emphasized that the housing module 10; 20; 30; 40 may encompass either one or both bypass valves 11, 12. If only one of the bypass valves 11 or 12 is arranged in the housing module, the other bypass valve in each case may be arranged in a cooled high-pressure turbine housing 35 (see FIG. 9) or a cooled low-pressure turbine housing 46 (see FIG. 10).

In summary, it can consequently be stated that the above-described turbocharger arrangement TLA is suitable in particular for engines (diesel engines or gasoline engines) which are provided with a cooled exhaust manifold integrated in the cylinder head. Here, the exhaust manifold may be produced for example from aluminum, which yields considerable cost savings owing to the material used and the packaging.

The turbocharger arrangement TLA or the housing module may furthermore be integrated in a cooled exhaust manifold which is flange-mounted on the cylinder head.

Furthermore, the turbocharger arrangement TLA or the housing module may be flange-mounted on an exhaust manifold which is then in turn flange-mounted on the cylinder head. Here, the exhaust manifold and therefore the housing may be cooled.

As described above, the housing module may finally be integrated in one and/or both in each case cooled turbine housing(s), which makes it possible for the arrangement to be made even more compact.

In addition to the above written disclosure of the invention, reference is hereby explicitly made to the diagrammatic illustration in FIGS. 1A to 10.

LIST OF REFERENCE SYMBOLS

TLA Multi-stage (two-stage) turbocharger arrangement
1, 2 Bypass/wastegate valve
3 Bypass/wastegate line
4 Aftertreatment device
5 High-pressure stage
6 Low-pressure stage
7 High-pressure compressor bypass
8 Cylinder head
9 Exhaust manifold
10; 20; 30; 40 Housing module
11 First bypass valve
11A High-pressure bypass line
11B Exhaust line
11C Valve plate
12 Second bypass valve
12C Valve plate
13 Bypass line/bypass duct
13A Low-pressure bypass line
14 Aftertreatment device
15 High-pressure stage
15A Turbine of the high-pressure stage
15B Compressor of the high-pressure stage
16 Low-pressure stage
16A Turbine of the low-pressure stage
16B Compressor of the low-pressure stage
17 Bypass of the high-pressure compressor
18 Cylinder head of the engine M
19 Exhaust manifold
21, 22 Steel inserts
23, 24 Valve seats
25 Charge-air cooler
26 Exhaust-gas recirculation arrangement
35 High-pressure stage
36 Low-pressure stage
45 High-pressure turbine housing
46 Turbine housing
S Flow direction of the exhaust gases

What is claimed is:

1. A multi-stage turbocharger arrangement (TLA) comprising:
   a high-pressure stage, including a high-pressure turbine of which has an associated first bypass valve; and
   a low-pressure stage which has a low-pressure turbine and a second bypass valve,
wherein
   at least one of the bypass valves is arranged in an associated, cooled housing module, wherein the housing module is integrated in a cooled exhaust manifold which is integrated in a cylinder head.

2. The turbocharger arrangement as set forth in claim 1, wherein the first bypass valve is arranged in a high-pressure bypass line which branches off from an exhaust line upstream of the inlet of the high-pressure turbine and which opens into the exhaust line again upstream of the inlet of the low-pressure turbine.

3. The turbocharger arrangement as set forth in claim 2, wherein the second bypass valve is arranged in a low-pressure bypass line which branches off from the exhaust line upstream of the low-pressure stage and which opens into the exhaust line again downstream of the outlet of the low-pressure turbine.

4. The turbocharger arrangement as set forth in claim 1, wherein the second bypass valve is arranged in a low-pressure bypass line which branches off from an exhaust line upstream of the inlet of the high-pressure turbine and which opens into the exhaust line again downstream of the outlet of the low-pressure turbine.

5. The turbocharger arrangement as set forth in claim 1, wherein the cooled exhaust manifold is flange-mounted on the cylinder head.

6. The turbocharger arrangement as set forth in claim 5, wherein the first bypass valve is arranged in a high-pressure bypass line which branches off from an exhaust line upstream of the inlet of the high-pressure turbine and which opens into the exhaust line again upstream of the inlet of the low-pressure turbine.

7. The turbocharger arrangement as set forth in claim 6, wherein the second bypass valve is arranged in a low-pressure bypass line which branches off from the exhaust line upstream of the low-pressure stage and which opens into the exhaust line again downstream of the outlet of the low-pressure turbine.

8. The turbocharger arrangement as set forth in claim 5, wherein the second bypass valve is arranged in a low-pressure bypass line which branches off from an exhaust line upstream of the inlet of the high-pressure turbine and which opens into the exhaust line again downstream of the outlet of the low-pressure turbine.

9. The turbocharger arrangement as set forth in claim 1, wherein the housing module is flange-mounted on the exhaust manifold which is flange-mounted on the cylinder head.

10. The turbocharger arrangement as set forth in claim 9, wherein the first bypass valve is arranged in a high-pressure bypass line which branches off from an exhaust line upstream of the inlet of the high-pressure turbine and which opens into the exhaust line again upstream of the inlet of the low-pressure turbine.

11. The turbocharger arrangement as set forth in claim 10, wherein the second bypass valve is arranged in a low-pressure bypass line which branches off from the exhaust line upstream of the low-pressure stage and which opens into the exhaust line again downstream of the outlet of the low-pressure turbine.

12. The turbocharger arrangement as set forth in claim 9, wherein the second bypass valve is arranged in a low-pressure bypass line which branches off from an exhaust line upstream of the inlet of the high-pressure turbine and which opens into the exhaust line again downstream of the outlet of the low-pressure turbine.

13. The turbocharger arrangement as set forth in claim 1, wherein the housing module is integrated in a cooled turbine housing of the high-pressure stage or of the low-pressure stage.

14. The turbocharger arrangement as set forth in claim 1, wherein the housing module contains both the first and second bypass valves.

15. The turbocharger arrangement as set forth in claim 1 wherein the housing module is connected to the exhaust manifold, and the exhaust manifold is connected to the cylinder head.

16. A multi-stage turbocharger arrangement (TLA) comprising:
- a high-pressure stage, including a high-pressure turbine of which has an associated first bypass valve; and
- a low-pressure stage which has a low-pressure turbine and a second bypass valve, wherein
- at least one of the bypass valves is arranged in an associated, cooled housing module, wherein the housing module has only one of the bypass valves, and wherein the other bypass valve is arranged in a cooled turbine housing of the high-pressure stage or of the low-pressure stage.

* * * * *